US008892998B2

(12) United States Patent
Yamada (10) Patent No.: US 8,892,998 B2
(45) Date of Patent: Nov. 18, 2014

(54) IMAGE PROCESSING APPARATUS

(75) Inventor: Akihiro Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1256 days.

(21) Appl. No.: 12/405,517

(22) Filed: Mar. 17, 2009

(65) Prior Publication Data

US 2009/0241025 A1   Sep. 24, 2009

(30) Foreign Application Priority Data

Mar. 24, 2008   (JP) .................................. 2008-076069

(51) Int. Cl.
| | | |
|---|---|---|
| G06F 17/00 | (2006.01) | |
| H04L 12/58 | (2006.01) | |
| H04N 1/00 | (2006.01) | |
| G06Q 10/10 | (2012.01) | |

(52) U.S. Cl.
CPC ............ *H04N 1/00209* (2013.01); *H04L 12/58* (2013.01); *G06Q 10/10* (2013.01); *H04N 1/00212* (2013.01); *H04N 2201/3235* (2013.01); *G06Q 10/107* (2013.01)
USPC ............................ 715/277; 709/206; 715/700

(58) Field of Classification Search
CPC ..... H04L 51/08; G06Q 10/10; H04N 1/00209
USPC ......... 715/205, 207, 234, 229, 236, 256, 273, 715/752, 758, 759, 277, 700; 709/206
See application file for complete search history.

(56) References Cited

U.S. PATENT DOCUMENTS

| | | | | | |
|---|---|---|---|---|---|
| 5,272,623 | A | * | 12/1993 | Grubb et al. ................... | 717/100 |
| 5,313,394 | A | * | 5/1994 | Clapp ........................... | 715/209 |
| 5,692,206 | A | * | 11/1997 | Shirley et al. ................. | 715/256 |
| 5,729,751 | A | * | 3/1998 | Schoolcraft ................... | 715/207 |
| 5,893,914 | A | * | 4/1999 | Clapp ........................... | 715/205 |
| 6,009,420 | A | * | 12/1999 | Fagg et al. ..................... | 706/45 |
| 6,067,531 | A | * | 5/2000 | Hoyt et al. ..................... | 705/35 |
| 6,182,095 | B1 | * | 1/2001 | Leymaster et al. ............ | 715/236 |

(Continued)

FOREIGN PATENT DOCUMENTS

| | | |
|---|---|---|
| JP | 2001-125850 | 5/2001 |
| JP | 2001-309107 | 11/2001 |

(Continued)

OTHER PUBLICATIONS

A Dynamic User Interface for Document Assembly by Miro Lehtonen Department of Computer Science University of Helsinki Finland (2002 ACM).*

(Continued)

*Primary Examiner* — William Bashore
*Assistant Examiner* — Nathan Shrewsbury
(74) *Attorney, Agent, or Firm* — Banner & Witcoff, Ltd.

(57) ABSTRACT

An image processing apparatus includes an receiving unit that receives e-mail via a first path, an acquiring unit that acquires an acquired file via a path other than the first path, a determining unit that determines whether an attached file and synthesization information for synthesizing the attached file and the acquired file are included in the received e-mail, and a synthesizing unit which, when the attached file and the synthesization information are included in the received e-mail, synthesizes the attached file and the acquired file based on the synthesization information.

15 Claims, 10 Drawing Sheets

(56) References Cited

U.S. PATENT DOCUMENTS

| | | | |
|---|---|---|---|
| 6,360,252 B1* | 3/2002 | Rudy et al. | 709/206 |
| 6,907,112 B1* | 6/2005 | Guedalia et al. | 379/88.17 |
| 7,136,180 B2* | 11/2006 | Utsunomiya | 358/1.15 |
| 7,370,066 B1* | 5/2008 | Sikchi et al. | 707/698 |
| 7,472,345 B2* | 12/2008 | Hailey et al. | 715/234 |
| 7,543,224 B2* | 6/2009 | Schwartz | 715/234 |
| 7,613,810 B2* | 11/2009 | Romero et al. | 709/227 |
| 7,711,691 B2* | 5/2010 | Coyne | 705/30 |
| 7,940,411 B2* | 5/2011 | Henry et al. | 358/1.15 |
| 7,941,749 B2* | 5/2011 | Agrawal et al. | 715/255 |
| 7,944,573 B2* | 5/2011 | Henry et al. | 358/1.15 |
| 2002/0097414 A1* | 7/2002 | Utsunomiya | 358/1.13 |
| 2003/0009392 A1* | 1/2003 | Perkowski | 705/26 |
| 2004/0015837 A1* | 1/2004 | Worthington et al. | 717/107 |
| 2004/0051911 A1 | 3/2004 | Yoshida et al. | |
| 2004/0172453 A1* | 9/2004 | De Mendonca et al. | 709/206 |
| 2005/0004885 A1* | 1/2005 | Pandian et al. | 707/1 |
| 2005/0280860 A1* | 12/2005 | Ito et al. | 358/1.15 |
| 2006/0031336 A1* | 2/2006 | Friedman et al. | 709/206 |
| 2006/0031340 A1* | 2/2006 | Mathew et al. | 709/206 |
| 2006/0089944 A1* | 4/2006 | Dandekar et al. | 707/102 |
| 2006/0129511 A1* | 6/2006 | Wu | 707/1 |
| 2007/0099659 A1* | 5/2007 | Borquez et al. | 455/556.2 |
| 2007/0099683 A1* | 5/2007 | Panther Trice et al. | 463/1 |
| 2007/0100648 A1* | 5/2007 | Borquez et al. | 705/1 |
| 2007/0150484 A1* | 6/2007 | Funge et al. | 707/10 |
| 2007/0192275 A1* | 8/2007 | Foygel et al. | 707/1 |
| 2007/0198533 A1* | 8/2007 | Foygel et al. | 707/10 |
| 2008/0177755 A1* | 7/2008 | Stern et al. | 707/100 |
| 2008/0222516 A1* | 9/2008 | Petri | 715/236 |
| 2008/0313287 A1* | 12/2008 | Wadsworth et al. | 709/206 |
| 2009/0113011 A1* | 4/2009 | Kuribara | 709/206 |
| 2009/0240735 A1* | 9/2009 | Grandhi et al. | 707/104.1 |
| 2009/0254530 A1* | 10/2009 | Jaffe et al. | 707/3 |
| 2010/0107091 A1* | 4/2010 | Amsterdam et al. | 715/760 |

FOREIGN PATENT DOCUMENTS

| | | |
|---|---|---|
| JP | 2002-236568 | 8/2002 |
| JP | 2003-099215 | 4/2003 |
| JP | 2003-177894 | 6/2003 |
| JP | 2004-110137 | 4/2004 |
| JP | 2005-216229 | 8/2005 |

OTHER PUBLICATIONS http://www.altapacific.com/solutions-emailcontrol.html available as of Feb. 23, 2003 (Altapacific).*

Office Action received for counterpart JP Application No. 2008-076069 mailed Feb. 23, 2010.

* cited by examiner

MAIN BODY OF E-MAIL
[ATTACHMENT UTILIZATION]  <-------------------- DECLARATIVE STATEMENT
ATTACHMENT 1. 1:OVERLAPPING:COPY:JOB ALL:1  <------ COMMAND STATEMENT 1
ATTACHMENT 2. 1:INSERTION:COPY:JOB 2:LAST   <------ COMMAND STATEMENT 2
ATTACHMENT 3. 1:INSERTION:PRINT:JOB 1:1     <------ COMMAND STATEMENT 3
ATTACHMENT 3. 2:OVERLAPPING:PRINT:JOB 1:2   <------ COMMAND STATEMENT 4

} COMMAND STATEMENT

FIG. 4B

| | ATTACHMENT 1 | ATTACHMENT 2 | ATTACHMENT 3 |
|---|---|---|---|
| FILE NAME | | | |
| FIRST PAGE | O | X | S |
| SECOND PAGE | NOTHING | NOTHING | △ |

FIG. 4C

ATTACMENT 2 : 1 : INSERTION : COPY : JOB2 : 1

FILE NAME | OBJECT PAGE | PROCESSING CONTENTS | ACQUIRING PROCESS | JOB ASSIGNMENT NUMBER | OBJECT PAGE

FIG. 5

PROCESSING TABLE

| RECORD NUMBER | ACQUIRING PROCESS | PROCESSING CONTENTS | JOB ASSIGNMENT NUMBER | OBJECTED PAGE |
|---|---|---|---|---|
| 1 | ATTACHMENT 1.1 : COPY | : OVERLAPPING | : ALL | : 1 |
| 2 | ATTACHMENT 2.1 : COPY | : INSERTION | : 2 | : LAST |
| 3 | ATTACHMENT 3.1 : PRINT | : INSERTION | : 1 | : 1 |
| 4 | ATTACHMENT 3.2 : PRINT | : OVERLAPPING | : 1 | : 2 |

PROCESSING RECORD (brace covering rows 1-4)

PROCESSING TABLE

| | ACQUIRING PROCESS | | PROCESSING CONTENTS | | JOB ASSIGNMENT NUMBER | | OBJECTED PAGE |
|---|---|---|---|---|---|---|---|
| 1 ATTACHMENT 1.1: | COPY | : | OVERLAPPING | : | ALL | : | 1 |
| 2 ATTACHMENT 2.1: | COPY | : | INSERTION | : | 1 | : | LAST |
| 3 ATTACHMENT 3.1: | PRINT | : | INSERTION | : | 1 | : | 1 |
| 4 ATTACHMENT 3.2: | PRINT | : | OVERLAPPING | : | 1 | : | 2 |

FIG. 7B

PROCESSING TABLE

| | ACQUIRING PROCESS | | PROCESSING CONTENTS | | JOB ASSIGNMENT NUMBER | | OBJECTED PAGE |
|---|---|---|---|---|---|---|---|
| 1 ATTACHMENT 1.1: | COPY | : | OVERLAPPING | : | ALL | : | 1 |
| 3 ATTACHMENT 3.1: | PRINT | : | INSERTION | : | 1 | : | 1 |
| 4 ATTACHMENT 3.2: | PRINT | : | OVERLAPPING | : | 1 | : | 2 |

FIG. 7C

PROCESSING TABLE

| | ACQUIRING PROCESS | | PROCESSING CONTENTS | | JOB ASSIGNMENT NUMBER | | OBJECTED PAGE |
|---|---|---|---|---|---|---|---|
| 1 ATTACHMENT 1.1: | COPY | : | OVERLAPPING | : | ALL | : | 1 |
| 4 ATTACHMENT 3.2: | PRINT | : | OVERLAPPING | : | 1 | : | 2 |

FIG. 7D

PROCESSING TABLE

| | ACQUIRING PROCESS | | PROCESSING CONTENTS | | JOB ASSIGNMENT NUMBER | | OBJECTED PAGE |
|---|---|---|---|---|---|---|---|
| 1 ATTACHMENT 1.1: | COPY | : | OVERLAPPING | : | ALL | : | 1 |

PAGE 1    PAGE 2    PAGE 3    PAGE 4    PAGE 5

IMAGE PROCESSING APPARATUS

CROSS-REFERENCE TO RELATED APPLICATIONS

This application claims priority from Japanese Patent Application No. 2008-076069 filed on Mar. 24, 2008, the entire subject matter of which is incorporated herein by reference.

TECHNICAL FIELD

The invention relates to an image processing apparatus.

BACKGROUND

JP-A-2001-125850 discloses a related art image processing device having a function of converting the form of main body of e-mail and printing the same based on header information added to e-mail when printing the main body of the e-mail.

SUMMARY

Illustrative aspects of the invention provide an image processing apparatus that improves usability of e-mail with an attached file.

DETAILED DESCRIPTION

<General Overview>

E-mail is sometimes used to transmit an attached file by adding electronic files such as image data and document data to e-mail as an attached file.

In such a case, message of the e-mail usually describes only a type (outline) of an attached file. That is, the message of the e-mail merely functions as a cover letter.

Therefore, illustrative aspects of the invention provide an image processing apparatus that improves usability of an e-mail with an attached file.

According to a first aspect of the invention, there is provided an image processing apparatus comprising: an receiving unit that receives e-mail via a first path; an acquiring unit that acquires an acquired file via a path other than the first path; a determining unit that determines whether an attached file and synthesization information for synthesizing the attached file and the acquired file are included in the received e-mail; and a synthesizing unit which, when the attached file and the synthesization information are included in the received e-mail, synthesizes the attached file and the acquired file based on the synthesization information.

According to a second aspect of the invention, the image processing apparatus further comprises: a creating unit that creates a record in which the synthesization information and the attached files are associated with each other; a memory unit; and a first storing unit that stores the record created by the creating unit in the memory unit, wherein the synthesizing unit synthesizes the attached file and the acquired file with reference to the record stored in the memory unit when the acquiring unit acquires the acquired file.

According to a third aspect of the invention, the image processing apparatus further comprises: a second storing unit that stores the attached file, which is used for a synthesizing process by the synthesizing unit, in the memory unit; and a deleting unit that deletes the attached file, for which the synthesizing process is terminated, from the memory unit.

According to a fourth aspect of the invention, in the image processing apparatus, wherein the second storing unit stores a plurality of attached files, which are used for the synthesizing process by the synthesizing unit, in the memory unit, and wherein the deleting unit deletes the attached file, for which the synthesizing process is terminated, among the plurality of attached files from the memory unit According to a fifth aspect of the invention, in the image processing apparatus, wherein, when the record created by the creating unit is not identical to any one of records stored in the memory unit, the first storing unit stores the created record to the memory unit.

According to a sixth aspect of the invention, in the image processing apparatus, wherein the synthesizing unit overlaps and synthesizes the attached file and the acquired file based on the synthesization information.

According to a seventh aspect of the invention, in the image processing apparatus, wherein the synthesizing unit inserts the attached file into the acquired file and synthesizes the attached file and the acquired file based on the synthesization information.

According to an eighth aspect of the invention, the image processing apparatus further comprises: a plurality of types of processing functions for generating and acquiring the acquired file, wherein the synthesizing unit synthesizes the attached file and the acquired file based on the synthesization information when executing a processing function selected by a user from the plurality of types of processing functions.

According to a ninth aspect of the invention, in the image processing apparatus, wherein, when the attached file is a file including data equivalent to a plurality of pages, the synthesizing unit synthesizes the attached file to the acquired file page by page.

According to a tenth aspect of the invention, there is provided a method for image processing comprising: receiving e-mail via a first path; acquiring an acquired file via a path other than the first path; determining whether an attached file and synthesization information for synthesizing the attached file and the acquired file are included in the received e-mail; and synthesizing the attached file and the acquired file based on the synthesization information when the attached file and the synthesization information are determined to be included in the received e-mail.

According to an eleventh aspect of the invention, the method for image processing further comprises: creating a record in which the synthesization information and the attached files are associated with each other; and storing the created record, wherein the attached file and the acquired file are synthesized with reference to the stored record when the acquired file is acquired.

According to the aspects of the invention, an attached file and an acquired file can be synthesized based on synthesization information. Therefore, it is possible to improve the usability of e-mail with an attached file.

According to the second aspect of the invention, the synthesizing process can be quickly carried out in comparison with a case where an attached file and an acquired file are synthesized directly by analyzing the synthesization information.

According to the third and fourth aspects of the invention, it is possible to prevent unnecessary files from being accumulated in the memory unit in advance.

According to the eighth aspect of the invention, it is possible to further improve the usability of e-mail with an attached file.

According to the ninth aspect of the invention, it is possible to further improve the usability of e-mail with an attached file.

<Exemplary Embodiments>

Exemplary embodiments of the invention will now be described with reference to the drawings.

An image processing apparatus according to the exemplary embodiment of the invention is applied to an image forming apparatus including a printing function and a scanning function.

(1) Image Forming Apparatus

Figure 1:
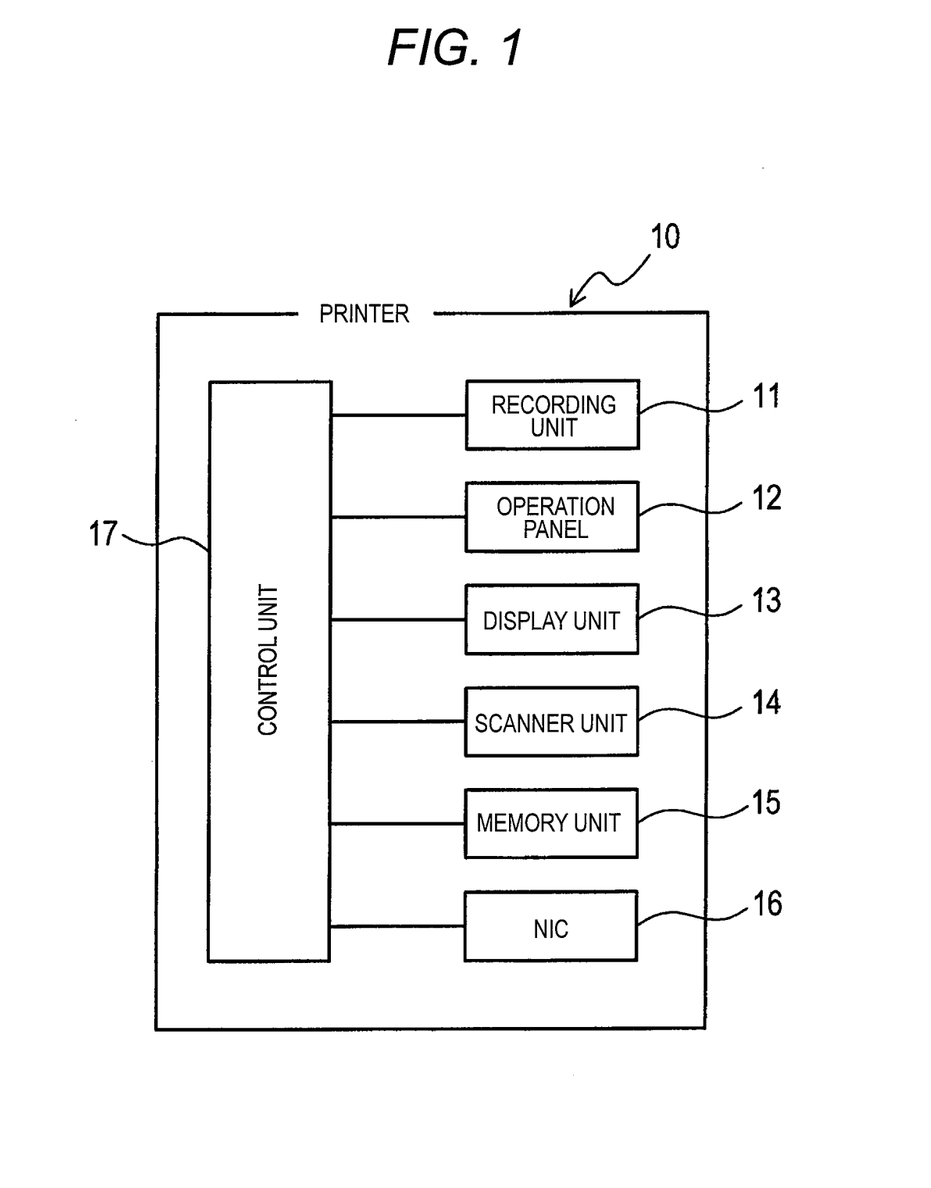
FIG. 1 is a block diagram showing the outline of an image forming apparatus according to an exemplary embodiment of the invention.

As shown in FIG. 1, an image forming apparatus 10 includes a recording unit 11 for forming an image on a recording medium such as recording sheet, etc., an operation panel 12 operated by a user, a display unit 13 for displaying various types of information, a scanner unit 14 for reading image information from a document and generating image data based on the read image information, a memory unit 15 consisting of non-volatile memory means such as magnetic recording means and flash memory, etc., and a control unit 17 for controlling the interface for network connection such as Network Interface Card (NIC) and controlling the recording unit 11, etc.

The display unit 13 includes a so-called touch panel function capable of detecting whether or not a user touches the display unit 13 and which part thereof is touched. The image forming apparatus 10 (control unit 17) can receive instructions from a user through the touch-panel function.

The control unit 17 is a microcomputer including a CPU, a ROM and a RAM, etc. Programs for executing the processes (which will be described later) are stored in the ROM.

The image forming apparatus 10 can be connected to a computer (not illustrated) and an external network such as the Internet, etc., via a network such as the Ethernet (registered brand-name) connected to the NIC 16.

Therefore, the image forming apparatus 10 can receive e-mail transmitted through the network. The image forming apparatus 10 can execute printing upon receiving a print command issued from a computer via the network.

(2) Operation of Image Forming Apparatus (2.1) Brief Operation

When the image forming apparatus 10 according to the exemplary embodiment receives e-mail via the NIC 16, the image forming apparatus 10 determines whether or not synthesization information to synthesize an attached file attached to the received e-mail and a file (hereinafter called an "acquired file") acquired through an acquisition route differing from the acquisition route of the attached file is included in the received e-mail. When the synthesization information is included, the image forming apparatus 10 synthesizes the attached file and the acquired file based on the synthesization information.

Here, the acquired file is a file acquired through an acquisition route differing from the acquisition route of the attached file, that is, a file differing from the file acquired as an attached file of e-mail. However, it is not necessary to make substantial contents of the files different from each other. Therefore, there may be a case where an image obtained when printing the attached file becomes identical to an image obtained when printing the acquired file.

In the exemplary embodiment, data (i.e., copy data) read from the scanner unit 14 and print data such as Page Description Language (PDL) data, etc. transmitted along with a print command from a computer are examples of the acquired file. That is, in the exemplary embodiment, as image processing to generate and acquire an acquired file, there are two types, one of which is a copying process and the other of which is a PC printing process by a print command from the computer. The copying process and the PC printing process are examples of a plurality of types of processing functions.

The synthesization information is a processing instruction to instruct how the attached file and the acquired file are processed and synthesized in detail. When the synthesization information is included in the received e-mail, the contents shown in FIG. 4A, for example, are described in the main body (body data) of the received e-mail.

Figure 4A:
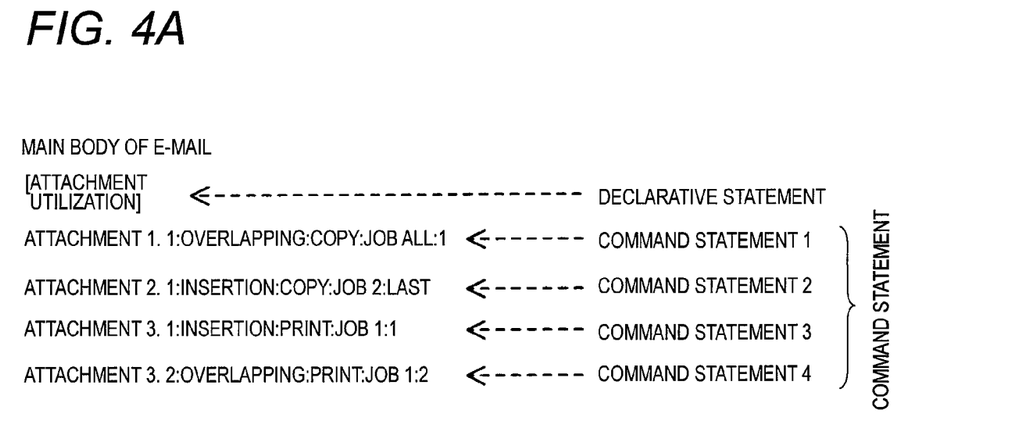
FIG. 4A is a view showing one example of processing information described in a main body of received e-mail.

That is, when the received e-mail includes a description of [attachment utilization] to declare that a processing instruction is included in a main body (hereinafter, the description is called a "declarative statement") and a command statement in which detailed contents of the processing instruction are described, it is determined that the synthesization information is included in the received e-mail.

Figure 4B:
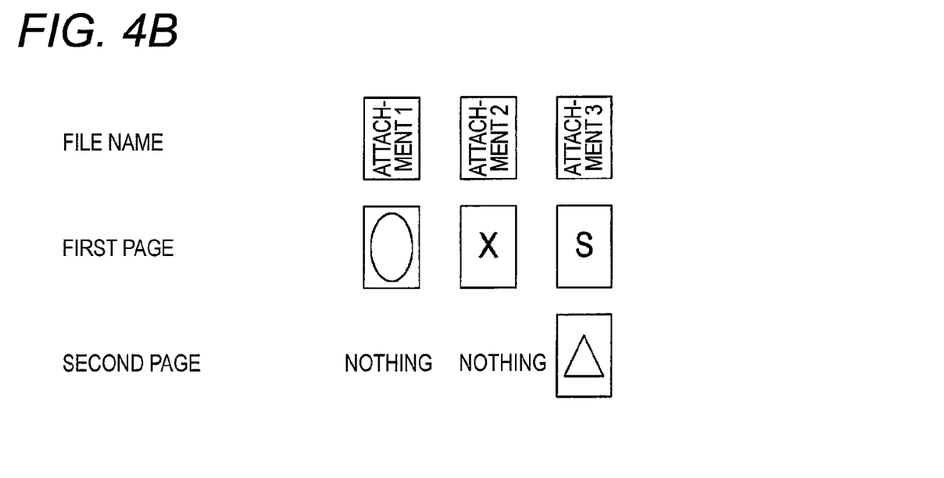
FIG. 4B is a view showing an attached file attached to the received e-mail.
Figure 4C:
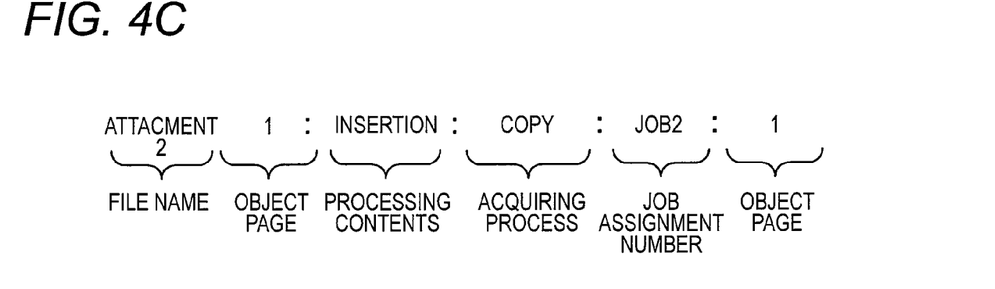
FIG. 4C is a view showing one example of a command statement.

FIG. 4C shows an example of a structure of a command statement. The structure of the command statement includes a file name of an attached file (hereinafter called an "object file") being the object of synthesizing process, an object page showing a detailed page, which becomes an object of a synthesizing process, of the object file, detailed processing contents, an acquiring process showing an acquisition route of an acquired file, a job assignment number, and information of an objected page showing a page of the acquired file for which a synthesizing process is executed.

The file name and the object page are divided by a period (.) while the other pieces of information are divided by a colon ([:]). The respective pieces of information are arranged in the order of file name, object page, processing contents, acquiring process, job assignment number, and objected page from the left side.

Incidentally, "overlapping" of the processing contents means a process for overlapping the data (hereinafter called "object data") specified by the file name and the objected page of the attached file and the data specified by the acquiring process and the object page so as to become a single type of data.

That is, when the objected page is [1], data of the first page of a file (hereinafter called a "synthesized file") newly created by the overlapping and synthesizing process becomes data in which the object data and data of the first page of the acquired file overlap each other.

Incidentally, "insertion" of the processing contents means a process for creating a new page by inserting the object data into a page corresponding to the objected page of the acquired file.

That is, if an insertion and synthesizing process is executed when the objected page is [1], the object data becomes the first page of the synthesized file, and the first page of the acquired file becomes the second page of the synthesized file. However, when the objected page is designated to be [Last], the object data is inserted as the next page data of the final page of the acquired file, and the inserted object data becomes the final page data of the synthesized file.

Thus, as described above, when the attached file is a file including a plurality of pages, the attached file is synthesized to the acquired file page by page by the overlapping and synthesizing process and the insertion and synthesizing process.

The job assignment number means the number of times of executing a synthesizing process instructed by a command statement from the time when a processing record described later, which is based on a processing instruction, is created.

That is, when e-mail in which synthesization information (processing instruction) is described is received, a processing record is created, and it is determined whether or not a processing record that is the same as the newly created processing record is written in the processing table in which already stored in the memory unit 15.

Only when it is determined that the same processing record as the newly created processing record is not written in the processing table, the newly created processing record is added to the processing table.

Figure 5:
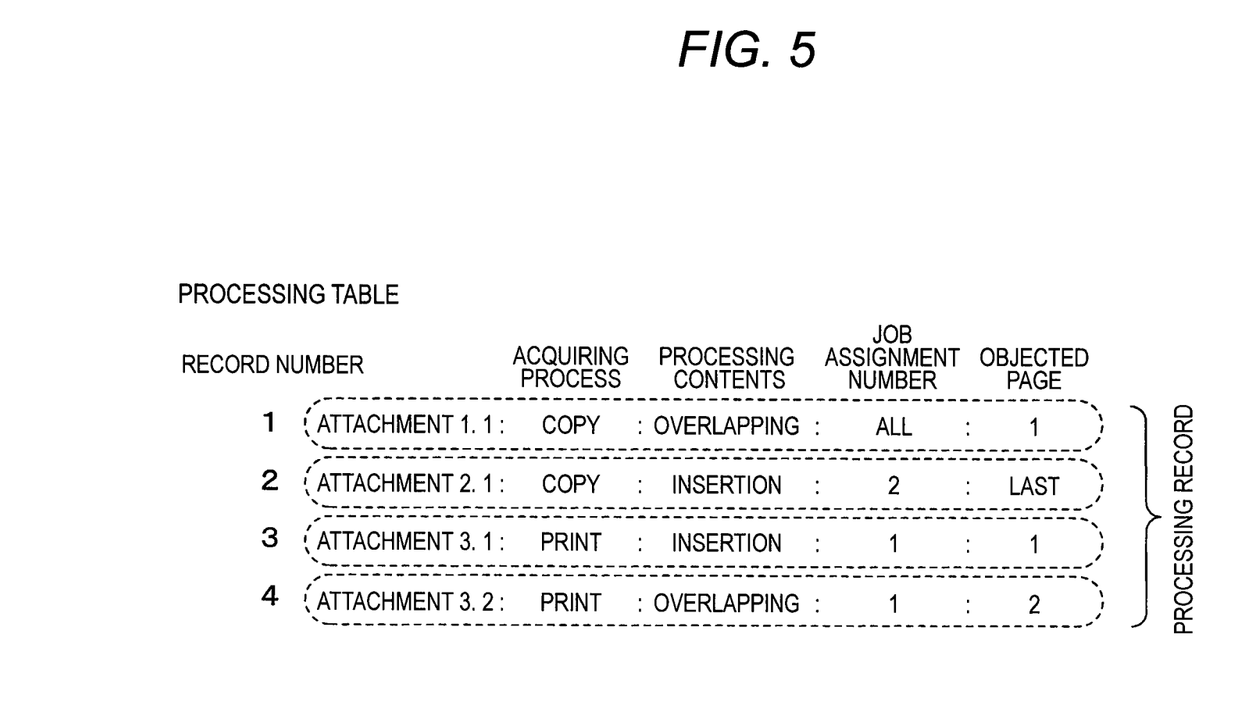
FIG. 5 is a view showing the concept of a processing table.

Further, the processing record is an assembly in which the synthesization information (processing instruction) and attached files (object files) are associated with each other. In detail, as shown in FIG. 5, the processing record includes line vectors in which respective information showing the file name, object page, acquiring process, processing contents, job assignment number and objected page is arranged in the left and right directions, and the processing table means an area in which processing records secured in the memory unit 15 are written.

If a user selects either one of a copying process or a PC printing process and executes it with the processing record stored, a command statement (processing record) in which the same acquiring process as the executed process is described is executed, and when execution for the job of the command statement is completed, only the job assignment number is decreased by [1].

Thus, the job assignment number is decreased by [1] whenever execution of the command statement is completed, and when the job assignment number becomes [0], the command statement is deleted from the processing table. That is, after the command statement (processing record) is executed for the job only by the number of times shown by the job assignment number, the command statement is deleted from the processing table.

Incidentally, when the job assignment number is [ALL], the job assignment number is not decreased. That is, if a user selects and executes either one of the copying process or the PC printing process, the command statement (processing record) having the same acquiring process as the executed processing described therein is permanently executed as a rule.

In order to delete the command statement (processing record) in which the job assignment number is [ALL], it is necessary for a user to carry out the following operation.

Figure 6A:
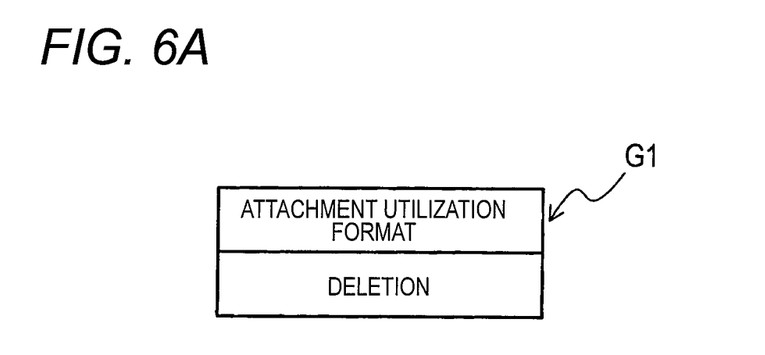
FIGS. 6A and 6B are views showing screens displayed at the display unit.

That is, first, the operation panel 12, etc., is operated, and the setting screen G1 to delete the processing record is displayed on the display unit 13 as shown in FIG. 6A, and [DELETE] on the setting screen is selected.

Figure 6B:
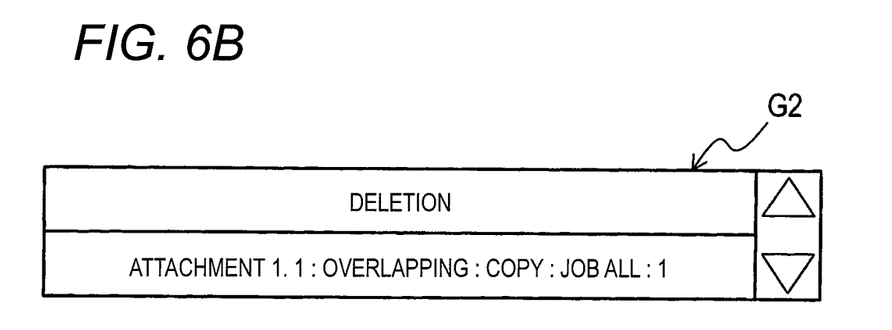

Accordingly, as shown in FIG. 6B, the screen G2 displaying the processing records written in the processing table is displayed. Then, if [DELETE] is selected with the corresponding processing record displayed on the screen G2, the displayed processing record is deleted from the processing table.

(2.2) Output Example of Synthesized File

In the processing table shown in FIG. 5, a processing record of the record number 1 (called "processing record 1") means [synthesizing process of always overlapping the first page of an attached file of file name (Attachment 1) to the first page of an acquired file whenever an acquired file is acquired by a copying process].

In the processing table shown in FIG. 5, the processing record of record number 2 (hereinafter called processing record 2) means [synthesizing process of inserting the first page of an attached file of file name (Attachment 2) after the final page of an acquired file in two times of copying processes executed after the processing record shown in the processing record 2 is created].

In the processing table shown in FIG. 5, the processing record of record number 3 (called processing record 3) means [synthesizing process of inserting the first page of an attached file of filename (Attachment 3) into the first page of the acquired file in the first time of the PC printing process executed after the processing record is created in the processing record 3].

In the processing table shown in FIG. 5, the processing record of record number 4 (called processing record 4) means [the second page of the attached file of file name (Attachment 3) is overlapped onto the second page of the acquired file in the first time of the PC printing process executed after the processing record shown in the processing record 4 is created].

Next, a description is given of the output example (printing example) of a synthesized file, taking for instance a case where the following execution processes are selected by a user and are sequentially executed with the processing record 1 through the processing record 4 written in the processing table.

(2.2.1) Execution Process 1

Referring to FIGS. 8A to 8G, the execution process 1 where a document consisting of four pages (refer to FIG. 8A) is sorted and copied by three will be described.

Incidentally, a sort and copy process means a copying process in which copied documents are arranged in the order of page per copy when a copying process is executed by a plurality of copies. For example, if a document consisting of four pages is simply sorted and copied by three regardless of the processing record 1 through the processing record 4, the image forming apparatus 10 outputs the printed matter in the order shown in FIG. 8B.

In the sort and copy process, although the job assignment number is decreased by [1] since it is regarded that one time of synthesizing process (command statement) has been completed at the moment when a copying process is completed by one copy, with respect to the copying process other than the sort and copy process the job assignment number is decreased by [1] at the point of time when all the contents of the copying process have been completed since it is regarded that onetime synthesizing process (command statement) has been completed.

When the execution process 1 is selected by a user, processing record 1 and processing record 2 the contents of which is copying (COPY) are executed. In detail, the image forming apparatus 10 first outputs printed matter in the order shown in FIG. 8C.

Figure 8A:
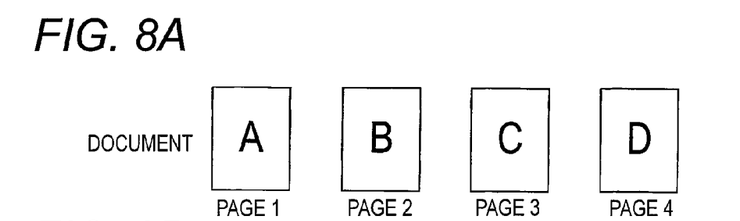
FIGS. 8A through 8G are views showing output examples.
Figure 8B:
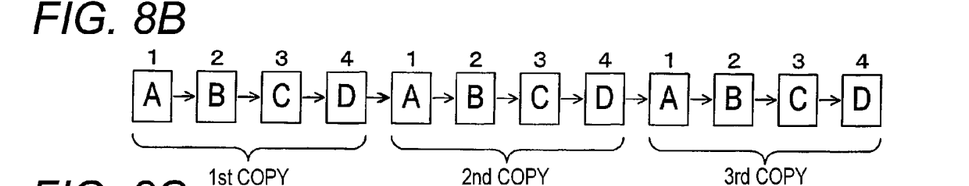
Figure 8C:
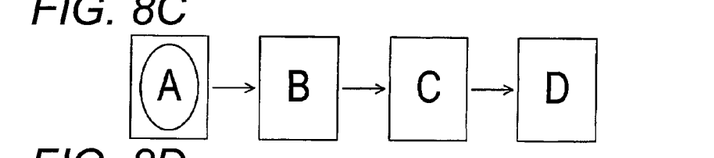

At this time, data of the first page of the attached file (Attachment 1) (see FIG. 4B, for example) overlap on the first page of the document (acquired file) according to the processing record 1 as shown in FIG. 8C.

Figure 8D:
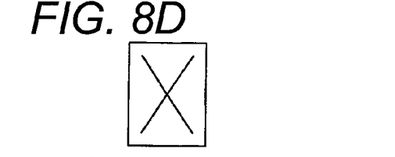

Next, the image forming apparatus 10 outputs the first page of the attached file (Attachment 2) (see FIG. 4B, for example) according to the processing record 2 as shown in FIG. 8D, and changes the job assignment number from [2] to [1] by decreasing the job assignment number of the processing record 2 by [1].

Figure 8E:
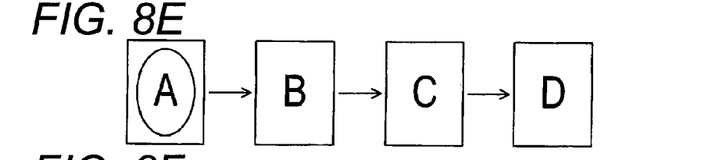

Next, the image forming apparatus 10 overlaps data of the first page of the attached file (Attachment 1) on the first page of the document (acquired file) according to the processing record 1, and outputs printed matter in the order shown in FIG. 8E.

Figure 7A:
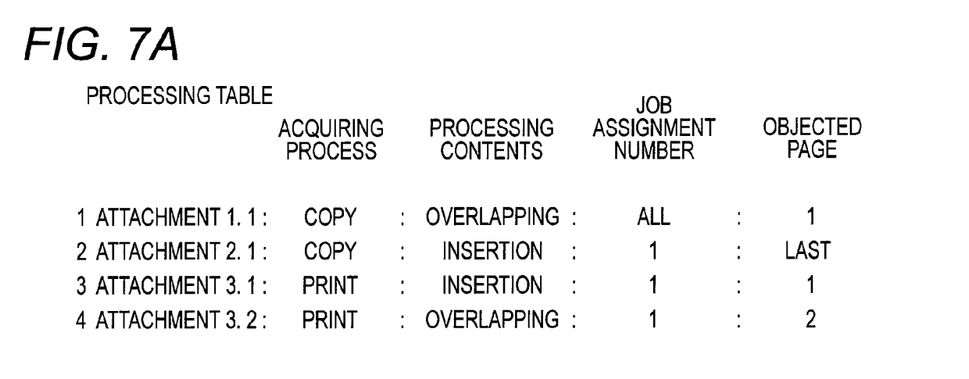
FIGS. 7A through 7D are views showing changes in the processing table.
Figure 7B:
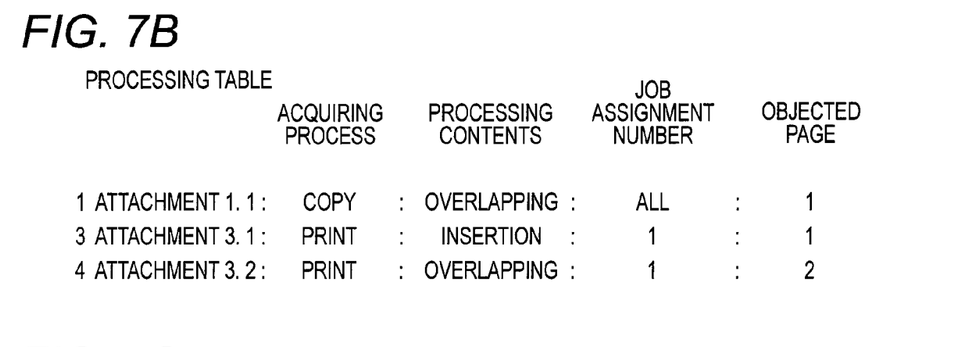
Figure 8F:
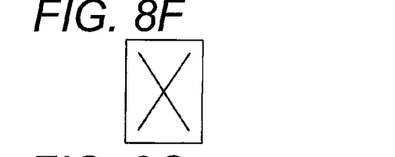

Next, the image forming apparatus 10 outputs the first page of the attached file (Attachment 2) according to the processing record 2 as shown in FIG. 8F, and deletes the processing record 2 from the processing table, as shown in FIG. 7B, since the job assignment number of the processing record 2 becomes 0.

Figure 8G:
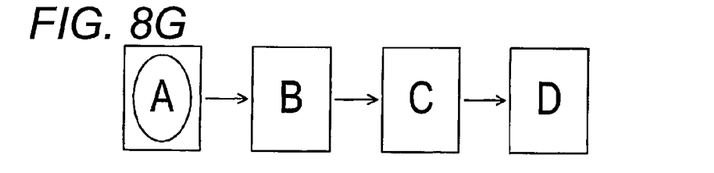

Next, the image forming apparatus 10 overlaps data of the first page of the attached file (Attachment 1) on the first page of the document (acquired file) according to the processing record 1, and outputs printed matter in the order shown in FIG. 8G. Since the processing record 2 is deleted from the processing table, the image forming apparatus 10 then finishes the execution process 1.

(2.2.2) Execution Process 2

Figure 9A:
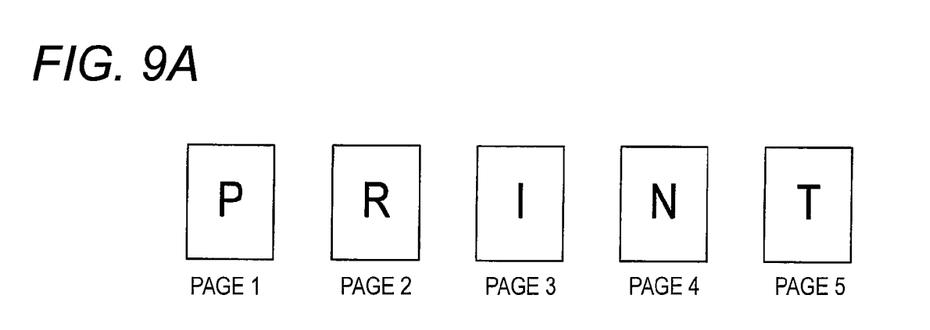
FIGS. 9A through 9C are views showing output examples.
Figure 9B:
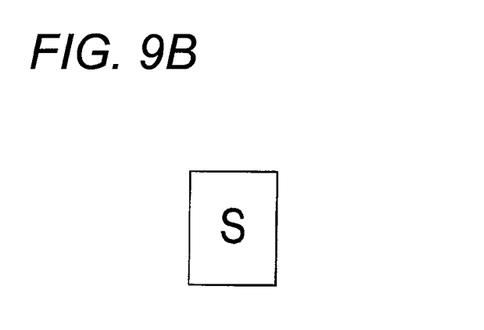
Figure 9C:
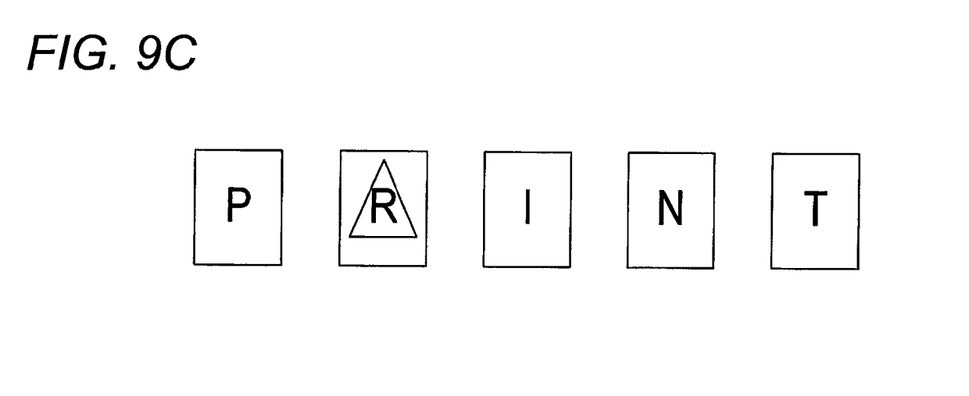

Referring to FIGS. 9A to 9C, the execution process 2 where executing PC print processing of data equivalent to five pages (refer to FIG. 9A) will be described.

When the execution process 2 is selected by a user after the execution process 1 is completed, the processing record 3 and the processing record 4 the processing contents of which is PC print (Print) are executed.

Figure 7C:
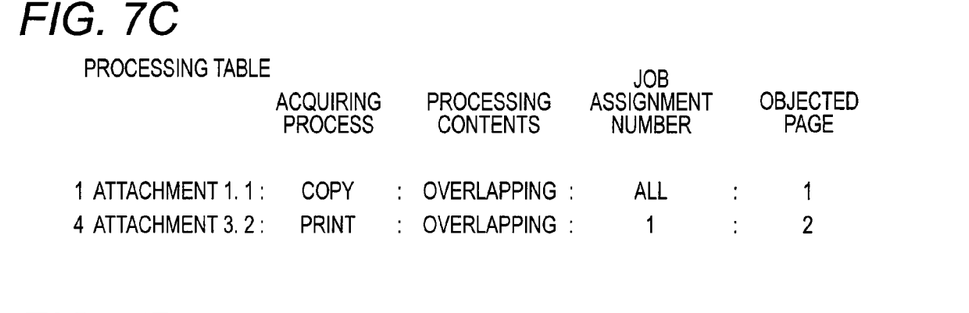

In detail, the image forming apparatus 10 first outputs the first page of the attached file (Attachment 3) (see FIG. 4B, for example), as shown in FIG. 9B, according to the processing record 3, and deletes the processing record 3 from the processing table as shown in 7C since the job assignment number of the processing record 3 becomes 0.

Figure 7D:
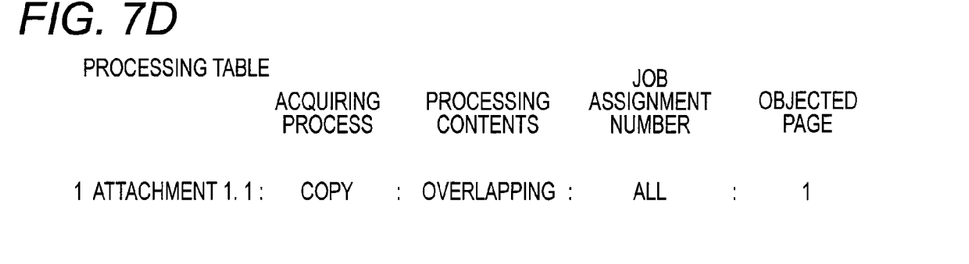

Next, the image forming apparatus 10 overlaps data of the second page of the attached file (Attachment 3) on the second page of the acquired file according to the processing record 4, and outputs printed matter in the order shown in FIG. 9C, and simultaneously deletes the processing record 4 from the processing table, as shown in FIG. 7D, because the job assignment number of the processing record 4 becomes 0.

(2.2.3) Execution Process 3

Figure 10A:
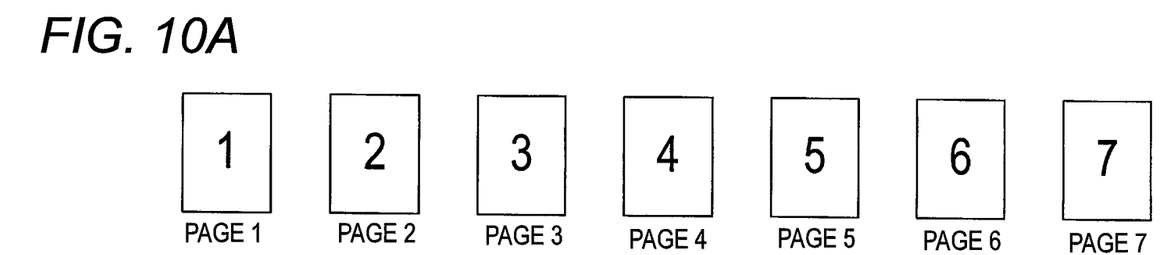
FIGS. 10A and 10B are views showing output examples.
Figure 10B:
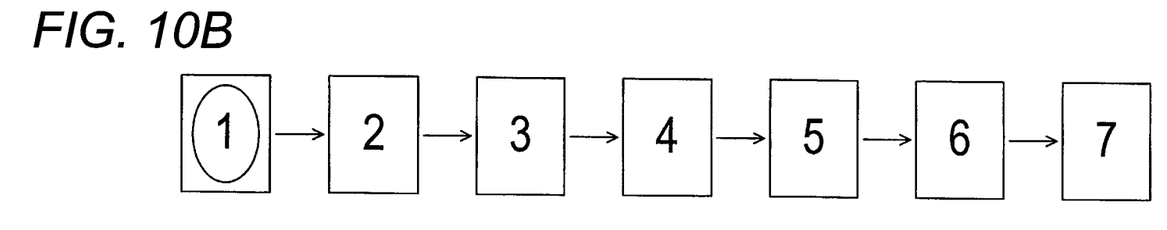

Referring to FIGS. 10A and 10B, the execution process 3 where copying a document equivalent to seven pages (refer to FIG. 10A) will be described.

If the execution process 3 is selected by a user after the execution process 2 is completed, the processing record 1 the processing contents of which is copying (COPY), and the image forming apparatus 10 overlaps data of the first page of the attached file (Attachment 1) onto the first page of the document (acquired file) according to the processing record 1, and outputs printed matter in the order shown in FIG. 10B.

(2.3) Detailed Operation

Figure 2:
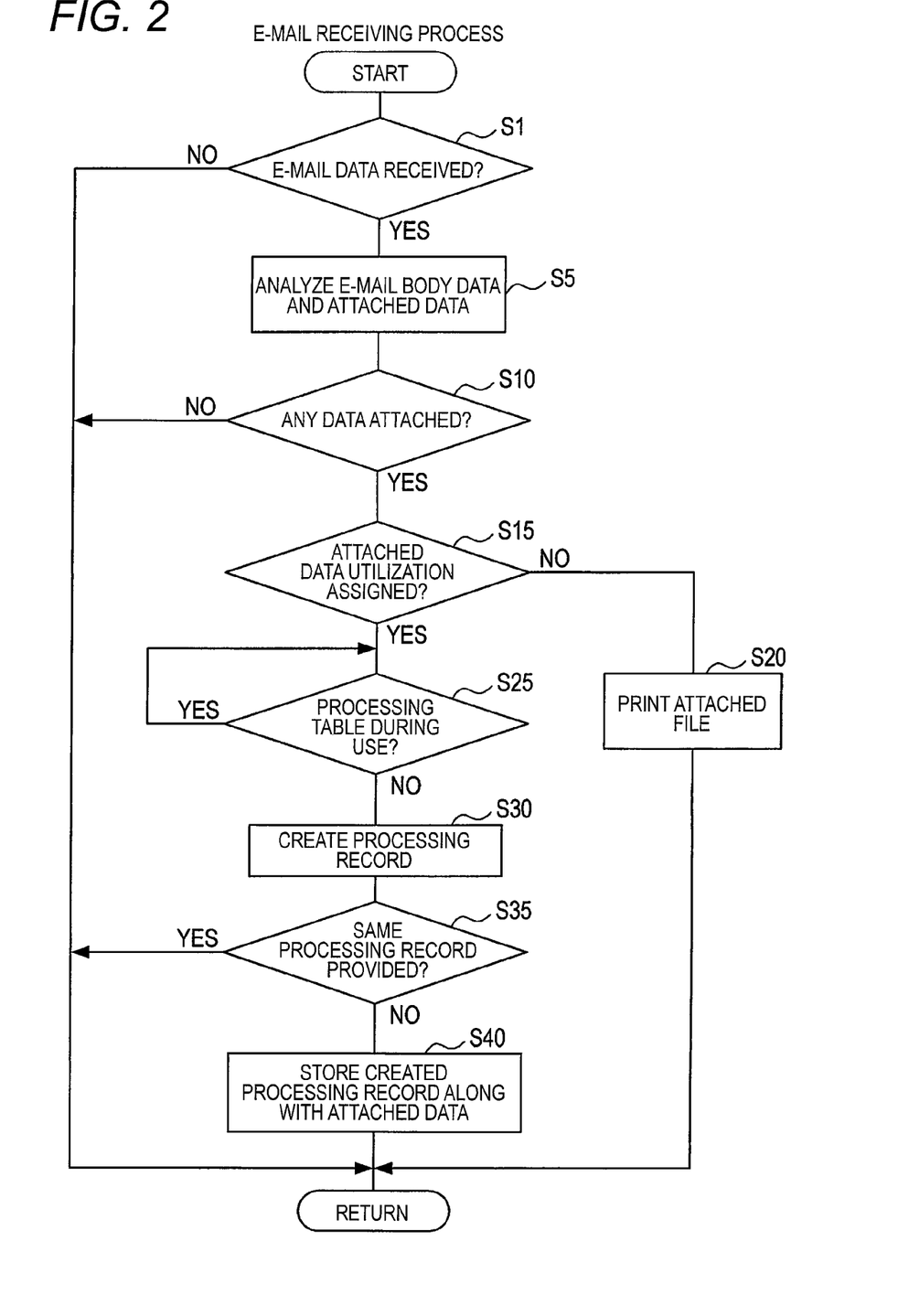
FIG. 2 is a flowchart showing a receiving process.
Figure 3:
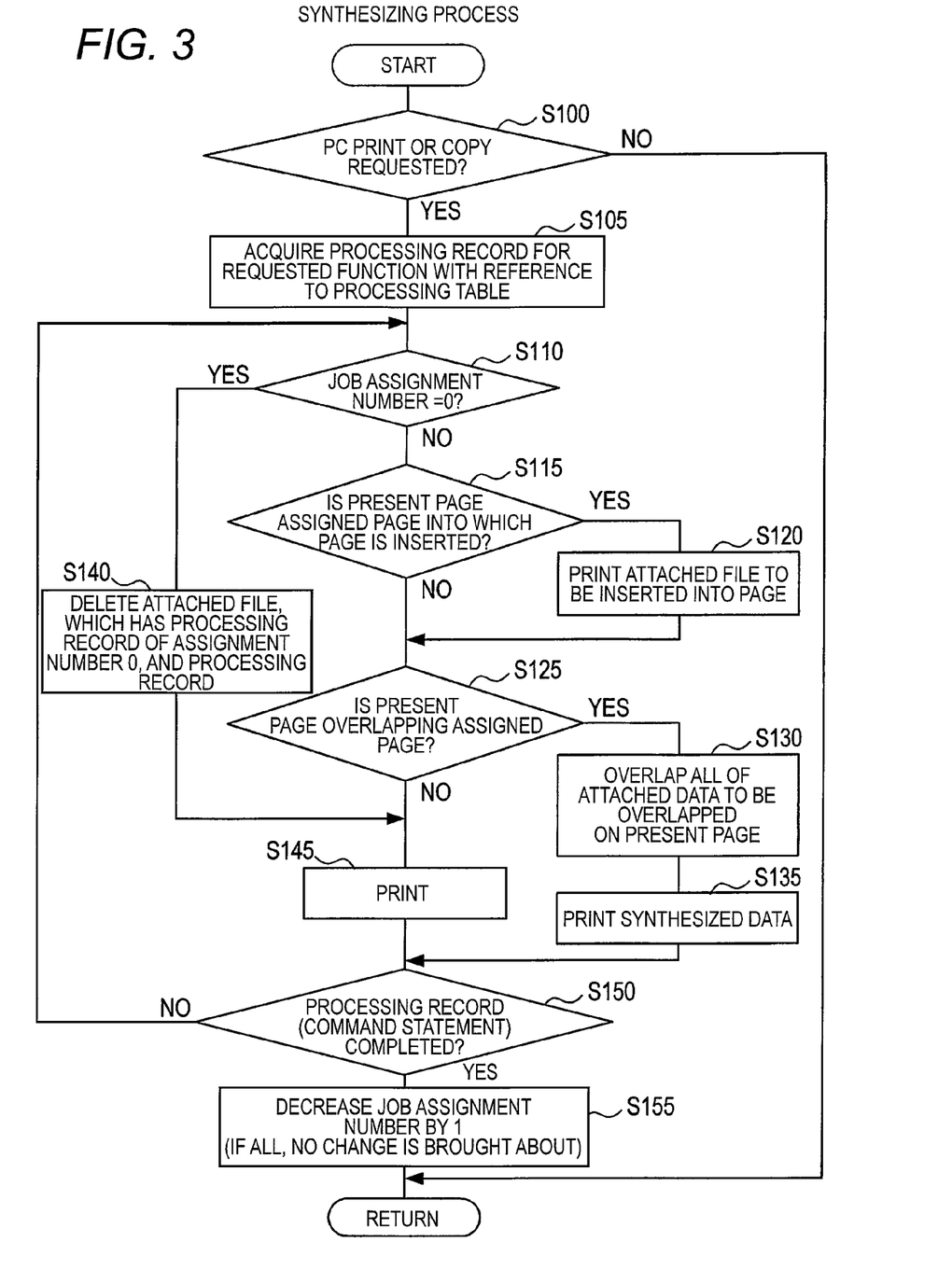
FIG. 3 is a flowchart showing a synthesizing process.

FIG. 2 is a flowchart showing a process (hereinafter called a receiving process) of received e-mail (processing instruction), and FIG. 3 is a flowchart showing a process (hereinafter called a synthesizing process) started when a user selects either one of a copying process or a PC printing process.

In addition, the receiving process and the synthesizing process are started as soon as the power switch (not illustrated) of the image forming apparatus 10 is turned on. Then, these processes are operated independently from each other and are terminated when the power switch is turned off.

(2.3.1) Receiving Process

Referring to FIG. 2, the receiving process will be described. As the receiving process is started, first, it is determined whether or not e-mail is received (S1). When it is determined that no e-mail is received (S1: NO), a standby state is brought about until e-mail is received.

In contrast, when it is determined that e-mail is received (S1: YES), the body data of the received e-mail and an attached file are analyzed (S5), and it is determined whether or not a file is attached to the received e-mail (S10).

At this time, when it is determined that no file is attached to the e-mail (S10: NO), step S1 is executed again. In contrast, when it is determined that a file is attached to the received e-mail (S10: YES), it is determined whether or not synthesization information, that is, a declarative statement and a command statement are included in the body data (S15).

When it is determined that no synthesization information (utilization assignment) is included in the body data (S15: NO), step S1 is executed again after the attached file is printed as it is (S20). In contrast, when it is determined that synthesization information (utilization assignment) is included in the body data (S15: YES), it is determined whether or not the processing table is used for the synthesizing process at present (S25).

At this time, when it is determined that the processing table is in use (S25: YES), a standby state is brought about. In contrast, when it is determined that the processing table is not in use (S25: NO), after a processing record is created based on the synthesization information included in the received e-mail (S30), it is determined whether or not the created processing record is already written in the processing table (S35).

When it is determined that the created processing record is not written in the processing table (S35: NO), the created processing record is written in the processing table, and is stored in the memory unit 15. An attached file corresponding to the written processing record (processing information) is stored in the memory unit 15 in a state when it is associated with the processing record (S40). Then, step S1 is again executed.

Herein, [processing record (processing information) is stored in the memory unit 15 in a state when it is associated with the processing record] means, in detail, that the first page of an attached file (Attachment 3) is associated with the processing record 3, and the second page of an attached file (Attachment 3) is associated with the processing record 4.

In contrast, when it is determined that the created processing record is already written in the processing table (S35: YES), step S1 is executed again with the created processing record not being written in the processing table.

(2.3.2) Synthesizing Process

Referring to FIG. 3, the synthesizing process will be described. When a synthesizing process is started, it is determined whether a user has selected the PC printing process or the copying process (S100), and when it is determined that neither has been selected (S100: NO), a standby state is brought about.

In contrast, when it is determined that either one of the processes has been selected (S100: YES), a processing record including an acquiring process corresponding to the process selected with reference to the processing table is acquired (S105). It is determined whether or not the job assignment number of the acquired processing record is [0] (S110).

Incidentally, although a plurality of processing records are acquired in S105, a description is given to facilitate understanding of the synthesizing process under the assumption that an acquired processing record is single.

At this time, when it is determined that the job assignment number is [0] (S110: YES), a file acquired by the PC printing process or the copying process is printed as it is (S145) after the acquired processing record and the attached file associated with the processing record are deleted (S140).

In addition, when it is determined in S110 that the job assignment number is not [0] (S110: NO), it is determined whether or not the page of an acquired file attempted to be printed at present is a page to be subjected to an insertion process (S115), and if it is determined that the page is not a page to be subjected to an insertion process (S115: NO), it is determined whether or not the page of an acquired file attempted to be printed at present is a page subjected to an overlapping process (S125).

In contrast, when it is determined that the page is a page subjected to an insertion process (S115: YES), step S125 is executed after the corresponding page of the attached file subjected to the insertion process is printed (S120). According thereto, the corresponding page of the attached file subjected to the insertion process printed in S120 is inserted before the page of the acquired file attempted to be printed at present. In other words, by executing S120 before S125, the insertion process is executed.

When it is determined that the page is not a page subjected to an overlapping process (S125: NO), the page of the acquired file attempted to be printed at present is printed as it is (S145).

Next, it is determined whether or not all of the processing contents described in the processing records (command statements) acquired in S105 are completed (S150), and when it is determined that all of the processing contents described in the processing records (command statements) are completed (S150: YES), step S100 is executed again after the job assignment number is decreased only by [1] (S155).

In contrast, when it is determined that all of the processing contents described in the processing records (command statements) are not completed (S150: NO), step S110 is executed again.

Further, when it is determined that the page is a page subjected to an overlapping process in S125 (S125: YES), synthesized data, in which the corresponding page of the attached file subjected to an overlapping process is overlapped on the page of the acquired file attempted to be printed at present, are created (S130), and step S150 is executed after the synthesized data are printed (S135).

According to the exemplary embodiments of the invention, when synthesization information to synthesize the attached file attached to received e-mail and an acquired file is included in the received e-mail, the attached file and the acquired file are synthesized based on the synthesization information. Therefore, it is possible to improve the usability of e-mail with the attached file.

In addition, in the exemplary embodiment, processing records in which synthesization information and attached files are associated with each other are created and stored, and the attached files and acquired files are synthesized with reference to the processing records when acquiring files. Therefore, the synthesizing process can be further quickly executed in comparison with a case where the attached files and the acquired files are synthesized directly by analyzing the synthesization information.

According to the exemplary embodiment, an attached file, for which a synthesizing process is terminated, of the attached files stored in the memory unit 15 is deleted from the memory unit 15. Therefore, it is possible to prevent unnecessary files from being accumulated in the memory unit 15 in advance.

According to the exemplary embodiment, the attached files and the acquired files are synthesized based on the synthesization information when executing a processing function, selected by a user, of a plurality of types of processing functions (in the exemplary embodiment, a PC printing process and a copying process). Therefore, it becomes possible to further improve the usability of e-mail with an attached file.

According to the exemplary embodiment, when an attached file is a file consisting of data equivalent to a plurality of pages, the attached file can be synthesized to the acquired file page by page. Therefore, it becomes possible to further improve the usability of e-mail with an attached file.

Incidentally, in the exemplary embodiment, S1 is one example of a receiving unit, S100 is one example of an acquiring unit, the step S5 is one example of a determining unit, S120 and S130 are one example of a synthesizing unit, S30 is one example of a creating unit, S40 is one example of a first storing unit and a second storing unit, and S140 is one example of a deleting unit.

(Modification to Exemplary Embodiments)

In the above-described exemplary embodiments, the invention is applied to an image forming apparatus. Alternatively, the invention may be applicable to a facsimile machine, a duplicating machine, a multi-function device, etc.

In addition, in the above-described exemplary embodiments, the overlapping process and the insertion process are used for the synthesizing process. However, the invention is not limited thereto.

Further, in the above-described exemplary embodiments, when newly created processing records completely match the processing records already described (stored) in the processing table, it is determined that both the processing records match each other. However, the invention is not limited thereto. For example, when the other pieces of information match each other only with the job assignment numbers differing from each other, it may be determined that both the processing records match each other.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. An image processing apparatus comprising:
   a processor; and
   memory storing computer readable instructions that, when executed, cause the image processing apparatus to provide:
      a receiving unit configured to receive e-mail via a first path;
      an acquiring unit configured to acquire an acquired file via a path other than the first path, wherein the acquired file specifies an order of a plurality of portions of the acquired file;
      a determining unit configured to determine whether an attached file and a synthesization information for synthesizing the attached file and the acquired file are included in the received e-mail; and
      a synthesizing unit which, when the attached file and the synthesization information are included in the received e-mail, is configured to synthesize the attached file and the acquired file based on the synthesization information,
   wherein the synthesization information includes:
      a declarative statement declaring that a processing instruction is included in a main body of the e-mail; and
      a command statement including contents of the processing instruction, wherein the contents of the processing instruction indicate a manner in which the attached file and the acquired file are to be processed and synthesized including an order in which the attached file is to be synthesized among the plurality of portions of the acquired file.

2. The image processing apparatus according to claim 1, wherein the computer readable instructions, when executed, cause the image processing apparatus to further provide:
a creating unit that creates a record in which the synthesization information and the attached files are associated with each other; and
a first storing unit configured to store the record created by the creating unit in a memory unit,
wherein the synthesizing unit is configured to synthesize the attached file and the acquired file with reference to the record stored in the memory unit when the acquiring unit acquires the acquired file.

3. The image processing apparatus according to claim 2, wherein the computer readable instructions, when executed, cause the image processing apparatus to further provide:
a second storing unit configured to store the attached file, when used for a synthesizing process by the synthesizing unit, in the memory unit; and
a deleting unit configured to delete the attached file, for which the synthesizing process is terminated, from the memory unit.

4. The image processing apparatus according to claim 3, wherein the second storing unit is further configured to store a plurality of attached files, when used for the synthesizing process by the synthesizing unit, in the memory unit, and
wherein the deleting unit is configured to delete the attached file, for which the synthesizing process is terminated, among the plurality of attached files from the memory unit.

5. The image processing apparatus according to claim 2, wherein, when the record created by the creating unit is not identical to any one of records stored in the memory unit, the first storing unit is configured to store the created record to the memory unit.

6. The image processing apparatus according to claim 1, wherein the synthesizing unit is configured to overlap and synthesize the attached file and the acquired file based on the synthesization information.

7. The image processing apparatus according to claim 1, wherein the synthesizing unit is configured to insert the attached file into the acquired file and to synthesize the attached file and the acquired file based on the synthesization information.

8. The image processing apparatus according to claim 1, wherein the computer readable instructions, when executed, cause the image processing apparatus to further provide:
a plurality of types of processing functions for generating and acquiring the acquired file,
wherein the synthesizing unit is configured to synthesize the attached file and the acquired file based on the synthesization information when executing a processing function selected by a user from the plurality of types of processing functions.

9. The image processing apparatus according to claim 1, wherein, when the attached file is a file including data equivalent to a plurality of pages, the synthesizing unit synthesizes the attached file to the acquired file page by page.

10. The image forming apparatus according to claim 1, wherein the command statement includes:
information indicating an object page of the attached file, wherein the object page is to be used in the synthesizing process;
processing contents; and
information indicating an object page of the acquired file to be used in the synthesizing process.

11. The image forming apparatus according to claim 1, wherein the plurality of portions of the acquired file corresponds to a plurality of pages and wherein the order in which the attached file is to be synthesized among the plurality of portions of the acquired file is specified by a page number of the acquired file.

12. A method for image processing comprising:
receiving an e-mail via a first path;
acquiring an acquired file via a path other than the first path, wherein the acquired file specifies an order of a plurality of portions of the acquired file;
determining whether an attached file and a synthesization information for synthesizing the attached file and the acquired file are included in the received e-mail; and
synthesizing the attached file and the acquired file based on the synthesization information when the attached file and the synthesization information are determined to be included in the received e-mail,
wherein the synthesization information includes:
a declarative statement declaring that a processing instruction is included in a main body of the e-mail; and
a command statement including contents of the processing instruction, wherein the contents of the processing instruction indicate a manner in which the attached file and the acquired file are to be processed and synthesized including an order in which the attached file is to be synthesized among the plurality of portions of the acquired file.

13. The method for image processing according to claim 12, further comprising:
creating a record in which the synthesization information and the attached files are associated with each other; and
storing the created record,
wherein the attached file and the acquired file are synthesized with reference to the stored record when the acquired file is acquired.

14. The method for image processing according to claim 12, wherein the command statement includes:
information indicating an object page of the attached file, wherein the object page is to be used in the synthesizing process;
processing contents; and
information indicating an object page of the acquired file to be used in the synthesizing process.

15. A non-transitory computer readable medium storing computer readable instructions that, when executed, cause an apparatus to:
receive an e-mail via a first path;
acquire an acquired file via a path other than the first path, wherein the acquired file specifies an order of a plurality of portions of the acquired file;
determine whether an attached file and a synthesization information for synthesizing the attached file and the acquired file are included in the received e-mail; and
synthesize the attached file and the acquired file based on the synthesization information when the attached file and the synthesization information are determined to be included in the received e-mail, wherein the synthesization information includes:
  a declarative statement declaring that a processing instruction is included in a main body of the e-mail; and
  a command statement including contents of the processing instruction, wherein the contents of the processing instruction indicate a manner in which the attached file and the acquired file are to be processed and synthesized including an order in which the attached file is to be synthesized among the plurality of portions of the acquired file.

* * * * *